Feb. 4, 1930.     P. FORSTER     1,745,413
ELECTROMAGNETIC CLUTCH
Filed Sept. 8, 1926

P. Forster
inventor

By: Marks & Clerk
Attys

Patented Feb. 4, 1930

1,745,413

UNITED STATES PATENT OFFICE

PAOLO FORSTER, OF GENOA CORNIGLIANO, ITALY

ELECTROMAGNETIC CLUTCH

Application filed September 8, 1926, Serial No. 134,310, and in Germany September 16, 1925.

This invention relates to electrical clutches for power transmission mechanisms provided with stationary exciting coil and with a double-cone as coupling means, in which the revolving part of the clutch presents a body with cylindrical outer surface.

By this conformation the magnetic flux does not cause any strain as is the case in the existing clutches due to the passage of flux from the stationary shell within the lateral part covering the coil. These axial strains are eliminated due to the passage of the magnetic flux in a radial direction from the stationary shell within the revolving shell.

The clutch according to the present invention presents the further advantage that the outer diameter of the revolving part of the clutch is reduced to a minimum, so that the clutch can be adapted for higher angular speeds than the clutches hitherto known.

In the clutch according to the present invention the coil is so arranged within the stationary shell that air passages are created between it and the shell, across which the heat developed in the coil is by the natural draft discharged towards the outside.

The coil may also be divided into different coil elements, and between the single coil elements there may also be provided ports for the passage of the air, so that the circulation of the air can take place across these intermediate ports.

The air circulation can eventually be increased so that the cooling air is pushed with pressure or drawn by aspirating means across the ports confining the coil.

Further object of the invention is a device by means of which the double cone is axially displaced during the opening of the clutch and kept apart from the other coupling element.

Figure 1:
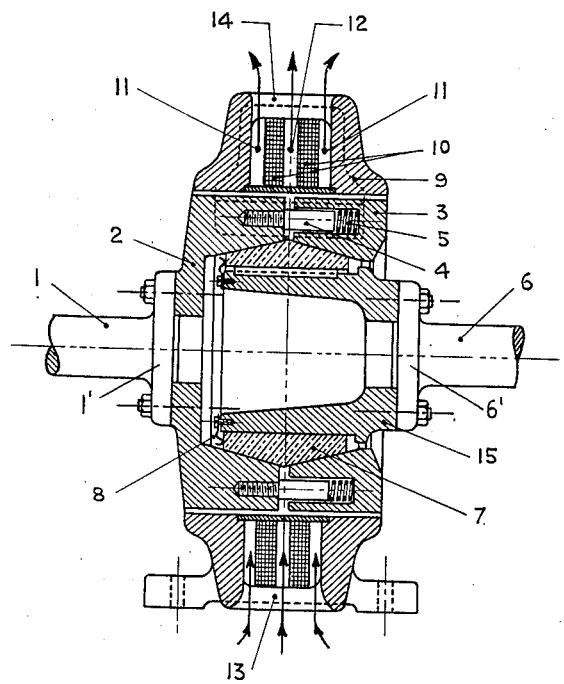
Fig. 1 is a vertical axial sectional view of the improved clutch in closed condition.
Figure 2:
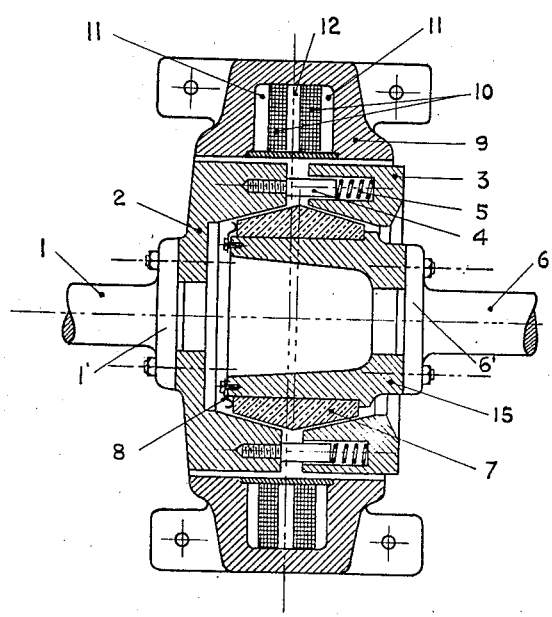
Fig. 2 is a horizontal axial sectional view of the clutch in the open condition.

In these figures 1 is the drive shaft with driving members 2 and 3 of the clutch. The driving member 1 is connected by means of a flange 1' and a plurality of studs with the driving member 2 of the clutch. The driving members 2 and 3 present at their inside a conical surface, which two surfaces are directed towards the middle plane of the clutch. The driving element 3 is carried by the driving member 2 by the interposition of the driving pins 4. The driven shaft 6 is connected with its flange 6' by a number of studs to the hollow sleeve 15, upon which is keyed the double cone 7, so as to allow an axial displacement. This double cone during the opening of the clutch is kept apart from the driving member of the clutch by means of springs 8 fastened upon the sleeve 15. The diameter of the hollow sleeve 15 is conveniently made somewhat larger than the diameter of the shafts; this allows the keys applied between the double cone and the sleeve to resist better the strains and to render the construction lighter. The connection of the driving shaft 1 and the driven shaft 6 by means of flanges and studs with the driving member 2 and with the sleeve 15 respectively presents the advantage that the clutch can be taken apart without requiring the displacement of the two shafts. In the stationary shell 9 is arranged the exciting coil 10. The same consists of two annular coil elements, which are separated from the shell by the ports 11 and between themselves by a port 12. By an admission opening 13 in the lower part of the stationary shell and an exit opening 14 in the upper part of it, a natural draft is generated as indicated in its direction by the arrows, which automatically discharges the developed heat of the coil towards the outside.

I claim:—

1. A magnetic clutch having a driving member, said driving member comprising a rotating cylindrical shell-like member arranged in two sections axially displaceable the one to the other and forming a cone-like friction surface at the inside, a driven member having a double cone element disposed inside of said shell-like member, an annular stationary magnet casing surrounding the cylindrical shell having an opening in the base and an opening in the top, a magnetic coil disposed in said casing in the middle transverse plane of the clutch, and annular air spaces provided between the magnetic coil and the magnet casing connecting said opening in the base with the opening in the top whereby a natural draft will be generated by the heat produced by the current and the heat carried off.

2. A magnetic clutch having a driving member, said driving member comprising a rotating cylindrical shell-like member arranged in two sections axially displaceable the one to the other and forming a cone-like friction surface at the inside, a driven member having a double cone element disposed inside of said shell-like member, an annular stationary magnet casing surrounding the cylindrical shell having an opening in the base and an opening in the top, a magnetic coil disposed in said casing in the middle transverse plane of the clutch, said magnetic coil having vertically arranged annular sections, and annular air spaces provided between the magnet casing and said coil and between the single sections of the coil connecting the base opening with the opening at the top.

In testimony whereof I have hereunto affixed my signature.

PAOLO FORSTER.